(12) United States Patent
Staszesky et al.

(10) Patent No.: US 8,207,728 B2
(45) Date of Patent: Jun. 26, 2012

(54) INTEGRATED POWER AND COMMUNICATION DEVICE

(75) Inventors: Douglas M. Staszesky, Glenview, IL (US); David Klein, Glenview, IL (US)

(73) Assignee: S&C Electric Company, Chicago, IL (US)

( * ) Notice: Subject to any disclaimer, the term of this patent is extended or adjusted under 35 U.S.C. 154(b) by 1407 days.

(21) Appl. No.: 11/345,932

(22) Filed: Feb. 1, 2006

(65) Prior Publication Data

US 2006/0217058 A1    Sep. 28, 2006

Related U.S. Application Data

(60) Provisional application No. 60/656,259, filed on Feb. 28, 2005.

(51) Int. Cl.
*G01R 15/18* (2006.01)
*G08C 15/06* (2006.01)
*G08C 19/20* (2006.01)

(52) U.S. Cl. .................................. 324/127; 340/870.03
(58) Field of Classification Search ............... 340/854.5; 73/49.1, 861.27, 40.5 R
See application file for complete search history.

(56) References Cited

U.S. PATENT DOCUMENTS 4,286,213 A * 8/1981 Fowler .......................... 324/127
7,282,944 B2 * 10/2007 Gunn et al. .............. 324/764.01

* cited by examiner

*Primary Examiner* — Brian A Zimmerman
*Assistant Examiner* — Jerold Murphy

(57) ABSTRACT

A power distribution system sensor and/or control device is integrated with a wireless communication device in an encapsulating weather resistant housing. The device includes a power supply that is adapted to couple to a conductor of the power distribution network to provide rectified and conditioned power as necessary to operate the distribution and/or control device and the wireless transceiver. The wireless communication device may be a low power packet data radio transceiver operating in accordance with any suitable communication standard.

15 Claims, 2 Drawing Sheets

INTEGRATED POWER AND COMMUNICATION DEVICE

This application claims the benefit of U.S. Provisional Application No. 60/656,259 filed Feb. 28, 2005.

TECHNICAL FIELD

This patent relates to power distribution system sensor or control devices, and more particularly, this patent relates to a power distribution system sensor and/or control device integrated with a communication device, such as a wireless communication device.

BACKGROUND

Detection and reporting of power distribution system conditions has traditionally required on-site visual inspection and reporting by the inspecting employee. Wired or wireless communication capability with remote sensing and data collection can eliminate or at least alleviate the requirement for visual inspection and provide real time system condition data. The remote sensing and data collection devices with wireless communication capability can be arranged such that the wireless communication components act as repeaters. This arrangement permits the wireless transceiver components to operate over large distances as a distributed radio network using relatively low transmit power.

Remote data collection and wireless reporting devices require a weather resistant and electrically insulated (e.g., to isolate electromagnetic interference) enclosure for the sensing and communication components, which add considerably to the cost of the device. Additionally, there is required a power source, e.g., a 120 volt alternating current (120 vac) power source, to supply power to the components disposed within the enclosure.

DETAILED DESCRIPTION

A power distribution system sensor and/or control device is integrated with a wireless communication device in an enclosing weather resistant housing. The device includes a power supply that is adapted to couple to a conductor of the power distribution network to provide rectified and conditioned power as necessary to operate the distribution and/or control device and the wireless transceiver. The wireless communication device may be a low power packet data radio transceiver operating in accordance with any suitable communication standard, including asynchronous packet data communication in the 902-928 MHz band, IEEE 802.11a, 802.11b or 802.11n compliant communications in the 2.4 GHz band, or any other suitable wireless data communication standard. As will be appreciated, the wireless communication device may further act as a repeater, receiving and retransmitting signals received from other wireless communication devices, and as such, operate as part of a distributed radio network. The wireless communication device itself, or by coupling via the distributed radio network, can act as an Internet access point.

The sensor and/or control device may be any device that provides data indicative of its own operation, an operating characteristic of the power distribution system or both. For example, the sensor and/or control device may be a voltage sensor, a current sensor, a voltage and current sensor or a fault detector each of which provide an indication of one or more operating characteristics of the power distribution system. The sensor and/or control device may also be a switch, a switch control, a fuse and an interrupter each of which includes a data output indicative of the state of the device. The sensor and/or control device may be a combination of such sensor and operating devices. It will be appreciated that the foregoing list of devices is exemplary and virtually any sensor and/or control device may be incorporated into the device.

Figure 1:
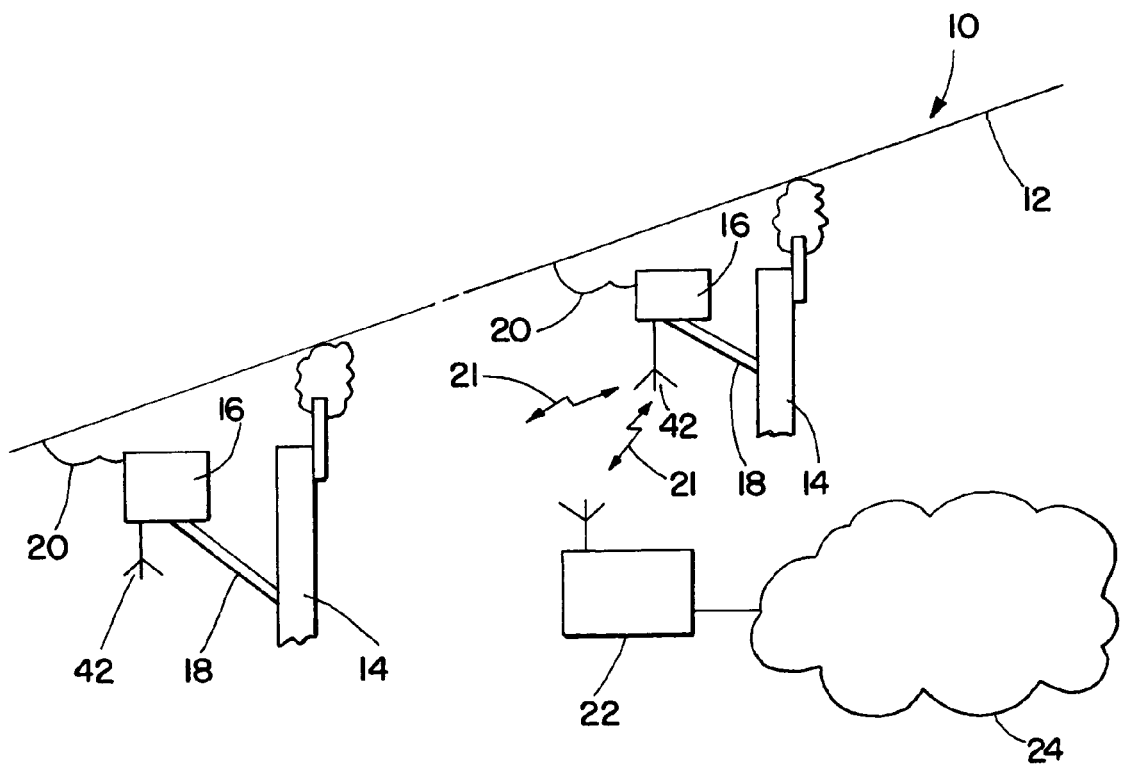
FIG. 1 is a graphic illustration of a power and communication device in accordance with a preferred embodiment of the invention.

Referring to FIG. 1, in a power distribution system 10 a current carrying conductor or line 12 is suspended between a plurality of poles 14. A power distribution system sensor and/or control device 16 (the device 16) is supported on the poles 14 by a suitable bracket 18. The device 16 is coupled to the line 12 by a conductor 20. It will be appreciated that the line 12 need not be suspended by poles, but could be a buried conductor. The device 16 may then be suitably mounted and coupled to the buried line.

Typical installations will see several devices 16 secured to poles 14 and coupled to the line 12. Although illustrated installed on adjacent poles 14 for purposes of illustrating the embodiments of the invention, the devices 16 need not be installed on adjacent poles or to the single line 12, but may be instead installed as necessary in a distributed manner throughout the power distribution system 10. The devices 16 may communicate with each other and/or with a base station 22 by radio transmissions 21. The base station 22 may be part of a centralized control/monitoring facility for the power distribution system 10. Alternatively, the base station 22 may be coupled to a communication network 24, such as the Internet, to which a control/monitoring facility for the power distribution system may be coupled. In this regard, each of the devices 16 may act as an Internet access point such that a field technician may utilize the device 16 to access either the Internet generally or to link particularly to the power distribution system centralized control/monitoring facility via the Internet.

Figure 2:
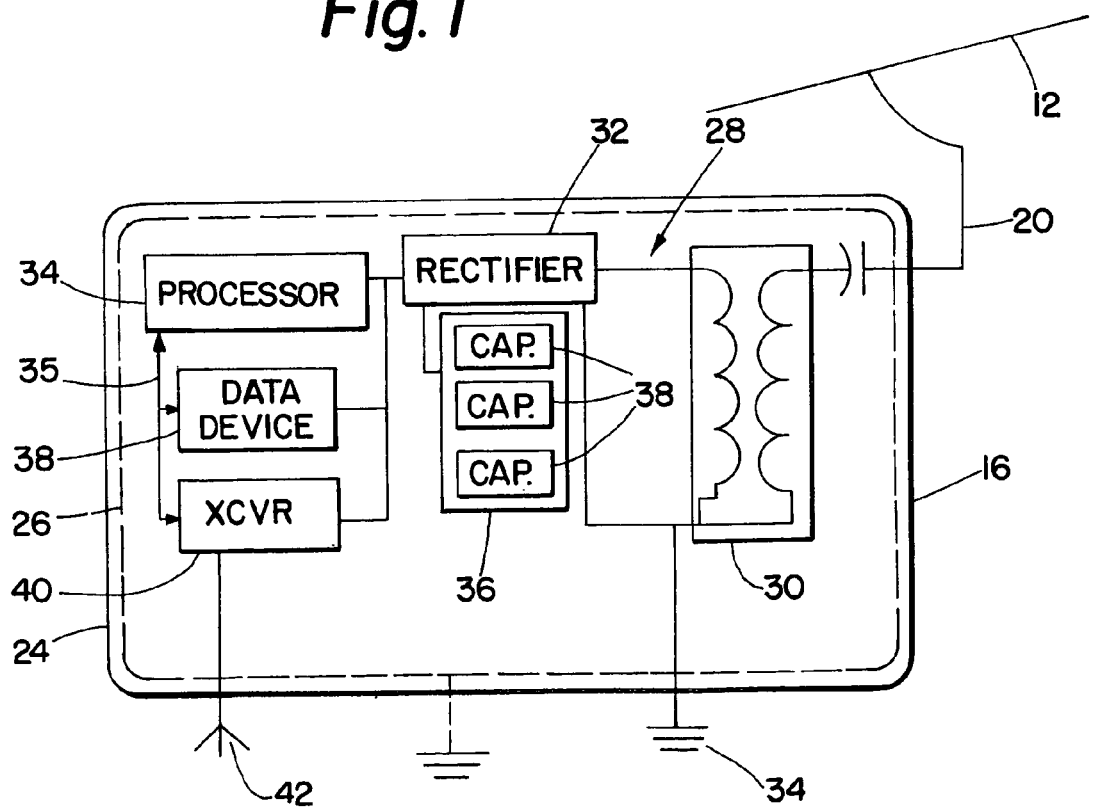
FIG. 2 is a block diagram of power and communication components that may be incorporated into the power and communication device illustrated in FIG. 1.

FIG. 2 illustrates the device 16 in functional block diagram form. The device 16 includes a weather resistant housing 24 that may be formed to include shielding 26 for shielding the electrical components of the device 16 disposed within the housing 24 from electromagnetic and other forms of noise and interference. The housing 24 is preferably molded from a weather resistant, electrically insulating epoxy material, such as the Cypoxy® material available from S & C Electric Co., Chicago, Ill. As will be explained in connection with additional embodiments of the invention, the electrical components of the device 16 may be molded into and/or encapsulated within the Cypoxy material providing a secure, weather resistant yet low cost enclosure.

The electrical components include a power supply 28. The power supply 28 may capacitively couple to the line 12 or may otherwise couple to the line 12 to extract power from the line 12. The power supply 28 may therefore includes a current transformer 30. The current transformer 30 is coupled to ground 34 as is the shielding 26. The transformer 30 is coupled to rectifying and conditioning circuitry 32 that is further coupled to a storage device 36 that is therefore coupled to and charged by the power supply 28. The storage device 36 may be a battery, such as a wet or gel cell battery. Alternatively, the storage device 36 may be a capacitor or capacitor bank (FIG. 2 illustrates a capacitor bank including three capacitors 38, although fewer or more capacitors may be used). The storage device 36 is configured to store sufficient power to allow the device 16 to operate through an extended outage period wherein electrical current is not conducted on the line 12.

As described, the device 16 includes a processor 34 including a memory (not depicted) containing a control program that directs the operation of the processor 34 for controlling the operation of the device 16. A data producing/collecting sensor and/or control device 38 that provides data indicative of its own operation, an operating characteristic of the power distribution system or both or alternatively collects data, e.g. a memory or buffer, from sensors, actuators or such devices (not separately depicted) is communicatively coupled to the processor 34, for example by a bus 35. For example, the sensor and/or control device 38 may be a voltage sensor, a current sensor, a voltage and current sensor or a fault detector each of which provide an indication of one or more operating characteristics of the power distribution system. The sensor and/or control device 38 may also be a switch, a switch control, a fuse and an interrupter each of which includes a data output indicative of the state of the device. It will be appreciated that the list of devices is exemplary and virtually any sensor and/or control device may be incorporated into the device 16.

The sensor and/or control device 38 communicates its data and/or the collected data to a wireless transceiver 40, which is also communicatively coupled to the processor 34. The wireless transceiver 40 is coupled to an antenna 42. The antenna 42 is shown external to the housing 24; however, it will be appreciated that the antenna 42 may be internal to the housing 24 or incorporated into the housing 24. For example, the antenna 42 may be molded into the housing 24.

The wireless transceiver 40 may be a packet radio, i.e., a transceiver capable of communicating discrete data packets in accordance with a suitable communication protocol. For example, the transceiver 40 may communicate using an asynchronous, spread spectrum communication protocol, such as that employed by the Utilinet® radios and networks of radios available from S & C. Other standards, such as the IEEE 802.11a, 802.11b and/or 802.11n standards, or any other suitable, low power data communication standard may be employed, however.

The device 16 may be configured and hard coded with an identification by which it identified to the base station 22 and within the distributed radio network so that communications are directed to it and its communications are identified when transmitted. Alternatively, upon initial powering of the device, the processor 34 may perform an initialization routine whereby the device 16 requests and is assigned an identification, such as a dynamic Internet Protocol (IP) address assignment. The identification is then used to send and receive data from the device.

After initialization, and in operation of the embodiment of the invention illustrated in FIG. 2, power is capacitively coupled from the line 12 to the power supply 28, which operates to rectify and condition the power such that it is suitable to power the processor 34, the sensor and/or control device 38 and the wireless transceiver 40. As data is collected by the device 38 it is communicated to the transceiver 40 for transmission to adjacent devices 16 and/or to the base station 22. The device 16 is advantageously self-powered and thus does not require a separate power supply. Furthermore, the electrical components of the device 16 may be encapsulated in the housing 24. In this regard, the device 16 is made secure and weather resistant yet remains low cost.

Figure 3:
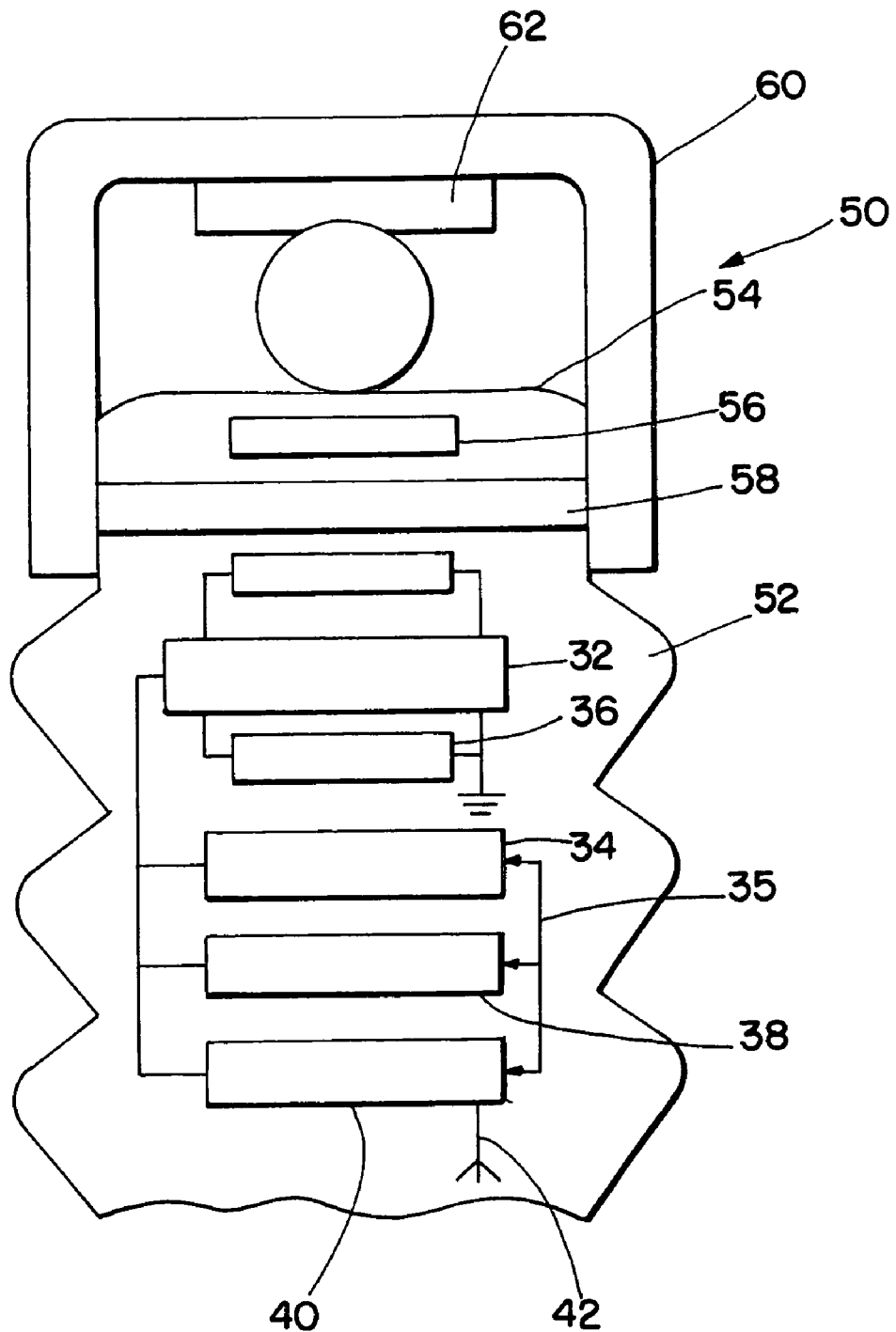
FIG. 3 is an illustration of a power and communication device in accordance with an alternate preferred embodiment of the invention.

FIG. 3 illustrates an alternate embodiment of the integrated power and control device of the present invention. Like elements to the embodiment depicted in FIGS. 1 and 2 are indicated with like reference numerals. The integrated power and control device 50 is formed as a pole-line insulator. That is, the device 50 includes an insulating body/housing 52 configured as a pole-line insulator having a configuration for such purpose as is well known in the art. The electrical components of the integrated power and control device 50 are encapsulated within the housing 52. The components may be preassembled and cast into the housing 52. Alternatively, the housing 52 may be formed to include a cavity into which the electrical components are disposed. The components may be then secured and sealed within the housing 52 using silicone potting compound or any other suitable material.

The line 12 is disposed on a top surface 54 of the housing 52 adjacent a coil 56 encircling a permeable core 58 for coupling power from the line 12 into the device 50. The coil 56 thereby acts as the secondary coil of a transformer, such as the transformer 30. While not required, the device 50 may further include a yoke 60 encircling and securing the line 12 to the housing 52. The yoke 60 itself may be made of a permeable material and may be coupled to the permeable core 58 such that the core 58 and the yoke 60 fully encircle the line 12. An insulator 62 may be provided between the line 12 and the yoke 60 to both insulate the line 12 from the yoke 60 as well as to facilitate dielectric stress relief. Such an arrangement of the core 58 and yoke 60 is fully disclosed and described in the commonly assigned U.S. Patent Application Ser. No. 60/656,260 filed Feb. 28, 2005 and Ser. No. 11/345,934, entitled "Current Sensor," filed Feb. 1, 2006, the disclosures of which are hereby incorporated by reference.

The invention has been described in terms of several embodiments, including a number of features and functions. Not all features and functions are required for every embodiment of the invention, and in this manner the invention provides a flexible, easily installed without breaking the conductor current sensor that has better noise immunity. The features discussed herein are intended to be illustrative of those features that may be implemented; however, such features should not be considered exhaustive of all possible features that may be implemented in a device configured in accordance with the embodiments of the invention. Moreover, the herein described embodiments are illustrative, not limiting of the invention. The invention is defined and limited only by the following claims.

The invention claimed is:

1. A pole-line insulator having an integrated power distribution or control device and a wireless communication device, comprising: a power supply; a power distribution or control device, the power distribution or control device having a data output wherein the data is indicative of an operating characteristic of the power distribution or control device or the power distribution network; a wireless transceiver coupled to the power distribution or control device to receive the data and to wirelessly communicate the data; insulating housing encapsulating the power supply, the power distribution or control device and the wireless transceiver, the insulating housing including a surface for supporting a conductor of a power distribution network such that the conductor is coupled to the power supply, and a yoke secured to the insulating housing and encircling the conductor supported on the surface, a coil disposed within the insulating housing and coupled to the power supply, the coil encircling a permeable core, the yoke coupling with the permeable core.

2. The pole-line insulator having an integrated power distribution or control device and a wireless communication device of claim 1, wherein the surface supports the conductor such that the conductor is coupled to the power distribution or control device.

3. The pole-line insulator having an integrated power distribution or control device and a wireless communication device of claim 1, the power distribution or control device comprising a device selected from the group of devices consisting of: a voltage sensor, a current sensor, a voltage and current sensor, a fault detector, a switch, a switch control, a fuse and an interrupter.

4. The pole-line insulator having an integrated power distribution or control device and a wireless communication device of claim 1, comprising a power storage device disposed within the housing and coupled to the power supply.

5. The pole-line insulator having an integrated power distribution or control device and a wireless communication device of claim 4, the power storage device comprising a battery, a capacitor or both a battery and a capacitor.

6. The pole-line insulator having an integrated power distribution or control device and a wireless communication device of claim 1, the wireless transceiver comprising a packet data radio.

7. The pole-line insulator having an integrated power distribution or control device and a wireless communication device of claim 1, the wireless transceiver comprising a repeater.

8. The pole-line insulator having an integrated power distribution or control device and a wireless communication device of claim 1, the wireless transceiver comprising an Internet access point.

9. The pole-line insulator having an integrated power distribution or control device and a wireless communication device of claim 1, the surface being disposed on a top of the insulating housing.

10. The pole-line insulator having an integrated power distribution or control device and a wireless communication device of claim 1, the insulating housing having a cavity within which are disposed the power supply, the power distribution or control device and the wireless transceiver.

11. The pole-line insulator having an integrated power distribution or control device and a wireless communication device of claim 1, wherein the power supply, the power distribution or control device and the wireless transceiver are cast within the insulating housing.

12. The pole-line insulator having an integrated power distribution or control device and a wireless communication device of claim 1, the insulating housing having an outer surface, the outer surface formed with concave and convex portions.

13. The pole-line insulator having an integrated power distribution or control device and a wireless communication device of claim 1, comprising a coil cast within the insulating housing adjacent the surface, the coil being coupled to the power supply.

14. The pole-line insulator having an integrated power distribution or control device and a wireless communication device of claim 13, wherein the coil comprises a first coil of a transformer.

15. The pole-line insulator having an integrated power distribution or control device and a wireless communication device of claim 1, further comprising a yoke secured to the insulating housing and encircling the conductor supported on the surface.

\* \* \* \* \*